United States Patent
Pipher et al.

(10) Patent No.: US 11,610,434 B2
(45) Date of Patent: Mar. 21, 2023

(54) EMOTIONAL RESPONSE CAPTURING WITH AUTOMATIC REPLY

(71) Applicant: T-MOBILE USA, INC., Bellevue, WA (US)

(72) Inventors: Nicholas Pipher, Parker, CO (US); Wilfred I. Tucker, Centennial, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/165,510

(22) Filed: Feb. 2, 2021

(65) Prior Publication Data

US 2022/0245376 A1 Aug. 4, 2022

(51) Int. Cl.
*G06V 40/16* (2022.01)
*H04L 51/02* (2022.01)

(52) U.S. Cl.
CPC ............ *G06V 40/166* (2022.01); *H04L 51/02* (2013.01)

(58) Field of Classification Search
CPC .......................... G06K 9/00255; H04L 51/02
See application file for complete search history.

(56) References Cited

U.S. PATENT DOCUMENTS

| | | | | |
|---|---|---|---|---|
| 7,908,554 B1* | 3/2011 | Blattner | ................ | H04L 51/043 |
| | | | | 715/706 |
| 8,392,832 B2* | 3/2013 | Arastafar | .............. | G06F 40/103 |
| | | | | 715/201 |
| 9,042,923 B1* | 5/2015 | Mirho | ..................... | H04L 51/10 |
| | | | | 455/466 |
| 9,584,563 B2* | 2/2017 | Partaker | ............ | H04M 3/42076 |
| 10,573,048 B2* | 2/2020 | Ni | ...................... | H04N 21/4788 |
| 10,862,938 B1* | 12/2020 | Mitchell | ................. | H04L 65/70 |
| 2003/0110450 A1* | 6/2003 | Sakai | .................... | G06F 40/109 |
| | | | | 715/256 |
| 2007/0254636 A1* | 11/2007 | Jiang | ....................... | H04M 3/42 |
| | | | | 455/414.1 |
| 2013/0055112 A1* | 2/2013 | Joseph | .................... | H04L 51/04 |
| | | | | 715/758 |
| 2013/0083906 A1* | 4/2013 | Roberts | .................. | H04M 11/00 |
| | | | | 379/88.13 |
| 2014/0282237 A1* | 9/2014 | Fuzell-Casey | ..... | G06Q 30/0601 |
| | | | | 715/810 |
| 2016/0241500 A1* | 8/2016 | Bostick | .................. | H04L 51/10 |

(Continued)

OTHER PUBLICATIONS

Cowie et al., Emotion Recognition in Human-Computer Interaction, Jan. 2001.

(Continued)

*Primary Examiner* — Patrice L Winder
*Assistant Examiner* — Angela M Widhalm De Rodriguez
(74) *Attorney, Agent, or Firm* — Marshall, Gerstein & Borun LLP (57) ABSTRACT

A system, method and computer readable media are disclosed to provide an automatic emotional response to a digital communication. The response may include an automatically captured photo, video or audio clip taken immediately after a communication is received which is then transmitted to the sender or other parties copied on the communication. The response may also include a standardized graphical representation of an emotional response, such as an emoticon or emoji generated from an image before transmission back to the sender.

17 Claims, 6 Drawing Sheets

(56) References Cited

U.S. PATENT DOCUMENTS

| | | | |
|---|---|---|---|
| 2016/0359777 A1* | 12/2016 | Tucker | H04L 51/16 |
| 2018/0027307 A1* | 1/2018 | Ni | G06K 9/00315 |
| | | | 345/419 |
| 2018/0083898 A1* | 3/2018 | Pham | H04L 51/02 |
| 2018/0225014 A1* | 8/2018 | Kassatly | G06K 9/00255 |
| 2018/0275853 A1* | 9/2018 | Kozloski | G06F 40/186 |
| 2019/0080458 A1* | 3/2019 | Wu | G06T 7/20 |
| 2019/0244639 A1* | 8/2019 | Benedetto | G11B 27/036 |
| 2020/0026347 A1* | 1/2020 | el Kaliouby | G06Q 30/0209 |
| 2020/0137011 A1* | 4/2020 | Guthery | H04L 51/04 |
| 2021/0232235 A1* | 7/2021 | Regani | G06F 3/03545 |
| 2021/0385179 A1* | 12/2021 | Heikkinen | H04L 51/046 |

OTHER PUBLICATIONS

Malekzadeh et al., A Review of Emotion Regulation in Intelligent Tutoring Systems, Journal of Educational Technology & Society, vol. 18, No. 4, Oct. 2015.
ScienceDirect, Facial Expression, Elsevier 2018.
Psychological Bulletin, vol. 115, No. 1, Is There Universal Recognition of Emotion from Facial Expression? A Review of the Cross-Cultural Studies, 1994.
Schroff et al., FaceNet: A Unified Embedding for Face Recognition and Clustering, Jun. 2015.

\* cited by examiner

EMOTIONAL RESPONSE CAPTURING WITH AUTOMATIC REPLY

TECHNICAL FIELD

This innovation relates to enhanced electronic communication through capturing a user's emotional response to a communication and sending an automatic reply that includes the emotional response.

BACKGROUND

Electronic communications such as text messages, email, social media posts and video conference calls are increasing every year. With that growth, there is also a growing need by the recipient of the messages to respond to those forms of digital communication. The responses may include written communication. However, written communication is estimated to be less than half of human-to-human communication. Emotional responses are also of paramount importance and are currently not well represented in some forms of electronic communication. Emotional responses may include, among other things, a smile, a surprised look, or a laugh of the recipient when reading a message.

Charles Darwin and other scientists have researched facial recognition of emotions. Some scientists have categorized emotions found in facial images using a Facial Action Coding System (FACS). More recently, natural language text and voice analysis have been used to detect attentiveness, frustration, or confusion of online learners during two-way video communication. Typically, these particular emotions are detected over a period of time and may further involve the learner typing an incorrect answer.

The electronic representation of emotional responses discussed in this disclosure may include images, video clips, audio clips, emoji's, GIFs or emoticons. In this disclosure, emoticons include letters, numbers or punctuation marks used to create sentiments using a keyboard, such as a smiley face created by a keyboard such as ":)". An emoji includes an image that represents a user's emotion, such as a broken heart image. Images also include Graphics Interchange Format (GIF) images. A GIF is a bitmap image, which may be used to represent an emotion and may or may not be animated. These emotional responses, when they are given at all, are currently manually selected by the responding party and are not transmitted back to the sender in real time.

Many senders, however, want an immediate emotional response. A sender of a romantic message may long for a similar message in return. The sender of a joke may want to hear the recipient laugh. The sender of bad news or mixed news may also wish to know immediately the emotional response of the recipient. While the recipient may currently reply electronically to the communication by typing words, that reaction is not immediate, nor does it necessarily accurately matching the recipients real emotion. There is therefore a need for automatically detecting and immediately and accurately transmitting the user's emotional state after receiving an initial electronic communication.

SUMMARY

This innovation leverages the video, audio, imaging and/or other data capture capabilities of a communication device, along with facial recognition techniques, to detect, capture and automatically send the user's emotional response after an initial digital communication is received by a user. The automatic response, enabled with prior consent of the user, may consist of a video clip, an image, including Graphic Interchange Format (GIF) images, an audio clip, an emoji, or an emoticon matching the user's response to the communication. One implementation of this idea is to make use of the camera and microphone commonly included with a smartphone. A smartphone application might automatically capture an image or an audio-visual clip immediately after receiving a communication. The application may automatically send the emotional response of the user containing the video clip, image or audio-visual clip to the requester.

In some cases, the user, the user equipment device, or the user's network may detect limited bandwidth to an extent that a video or digital image cannot be included as the indication of the emotional response and a more data-efficient response (e.g., where video conferencing requires a minimum of 600 Kbps with 1.5 Mbps recommended) may be sent. This data-efficient response may additionally include a warning to the recipient that the response has been modified due to inadequate data bandwidth. In cases of inadequate available bandwidth, the user equipment device may capture images or audio and perform additional processing on the image, audio or video clip in order to transmit a low bandwidth image or emoticon reflecting the captured emotional state of the user. The user equipment device processes the captured response and then normalizes or preprocesses the image. Once the user's emotion is captured and the image normalized, the emotion can then be determined by using the Facial Actions Coding System (FACS) or another classification system using the normalized image. The processor can then perform a lookup using a dynamic table populated by machine learning or deep learning techniques that associate over time the users emotions with emoticons, GIF's or emojis. In another embodiment the lookup may be in a table of emoticons, GIFs or emojis configured by the user or a default configuration that associates the emotion with an emoticon, GIF or emoji. These representative responses could be automatically sent as a reply to the original communications, or shared with a social media server, a conference call server or conference call network element. By automatically uploading a limited bandwidth image, using a standardized image by reference (e.g., sending a Unicode reference to an emoji) or sending an emoticon, the user can then share emotions using a minimum of data to respond.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

Figure 1:
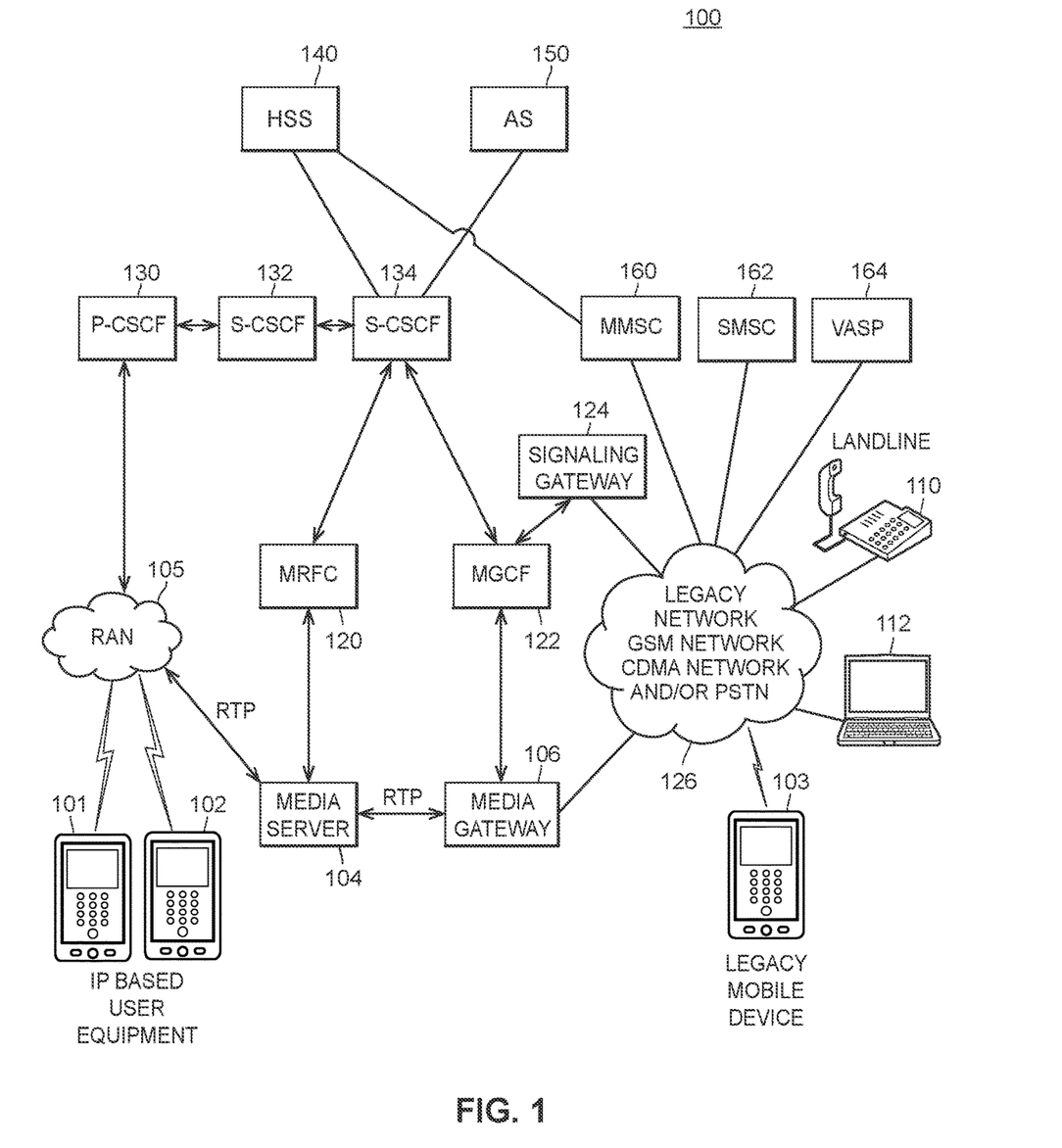
FIG. 1 illustrates a block diagram of an example communication system in accordance with embodiments of the present disclosure, including a plurality of user equipment (UE) devices.

FIG. 1 illustrates a block diagram of an exemplary communication system 100. FIG. 1 includes various components configured as an Internet Protocol (IP) Multimedia Subsystem (IMS), as well as its connectivity to one or more legacy networks 126. This communication system may contain a subsystem for delivering IP multimedia services to IP-based devices using IP-based protocols including voice and video, which typically uses Session Internet Protocol (SIP) or the H.323 protocol. Those protocols, may, in turn make use of Binary Floor Control Protocol (BFCP) and H.239 protocols, respectively. FIG. 1 shows communication devices, such as User Equipment 1 (UE1) 101 and User Equipment 2 (UE2) 102, as well as an Application Server (AS) 150. In FIG. 1, UE1 101 and UE2 102 are wireless devices communicating through one or more radio access networks (RANs) 105. Both wireless devices eventually communicate through the radio access networks 105 to a Proxy-Call Session Control Function (P-CSCF) 130, which in the IMS architecture is attached to the Interrogating-Call Session Control Function (I-CSCF) 132 that selects and attaches to a Serving-Call Session Control Function (S-CSCF) 134, which connects the communication to an applications server (AS) 150. As shown in FIG. 1, the AS 150 can connect to multimedia elements via the S-CSCF 134. The S-CSCF 134 connects to Media Server 104 via a Media Resource Function Controller (MRFC) 120. The S-CSCF 134 may also connect to a Media Gateway Control Function (MGCF) 122.

In one embodiment, the AS 150 may be a specialized Telephony Application Server (TAS), which performs customary calling features or may be any of a variety of other Application Servers such as a Multimedia Telecommunication Application Server (MTAS) or a Video Conferencing Application Server, which performs conferencing, video features, or call center services. The AS 150 enables features, such as emotional response, which may be enabled on a per subscriber or network wide basis as stored at a Home Subscriber Server (HSS) 140. The HSS 140 stores subscriber records and is contacted by the AS 150 to authorize features on a per subscriber basis. The AS 150 may also access the legacy network 126 by use of Media Gateway Controller Function (MGCF) 122, Signaling Gateway 124 and Media Gateway 106. The Legacy Network 126 may include other mobile networks such as 2G GSM or CDMA mobile networks as well as landlines accessed by the Public Switch Telephone Network (PSTN). Landline Phones 110, a personal computer 112 (e.g., a laptop, tablet, or desktop computer) connected via IEEE 802.11 Wi-Fi or by hardwired means, and Legacy 2G Mobile Phones 108 are accessible through Legacy Networks 126 as shown on FIG. 1.

The network may also include a Multi-Media Message Center (MMSC) 160, as well as a Short Message Service Center (SMSC) 162, in order to enable multi-media messaging and short message service messaging. In addition, one or more Value-Added Service Providers (VASP) 164 may be attached to the network that may deliver special application services, such as sports scores, horoscopes, lottery notifications, and the like to user equipment devices. In one embodiment, these services may, in addition to delivering an information service, also request, when authorized, an emotional response from the user of the user equipment device. For example, those who have purchased lottery tickets may have pre-authorized their emotional response reaction, such as at the time of purchase. The emotional response is then electronically requested at the moment they were notified that they won the lottery. A user of a sports score service may also authorize the emotional reaction upon notification from the value-added service provider VASP that their team scored during the game or upon notification that their team won the game.

Figure 2:
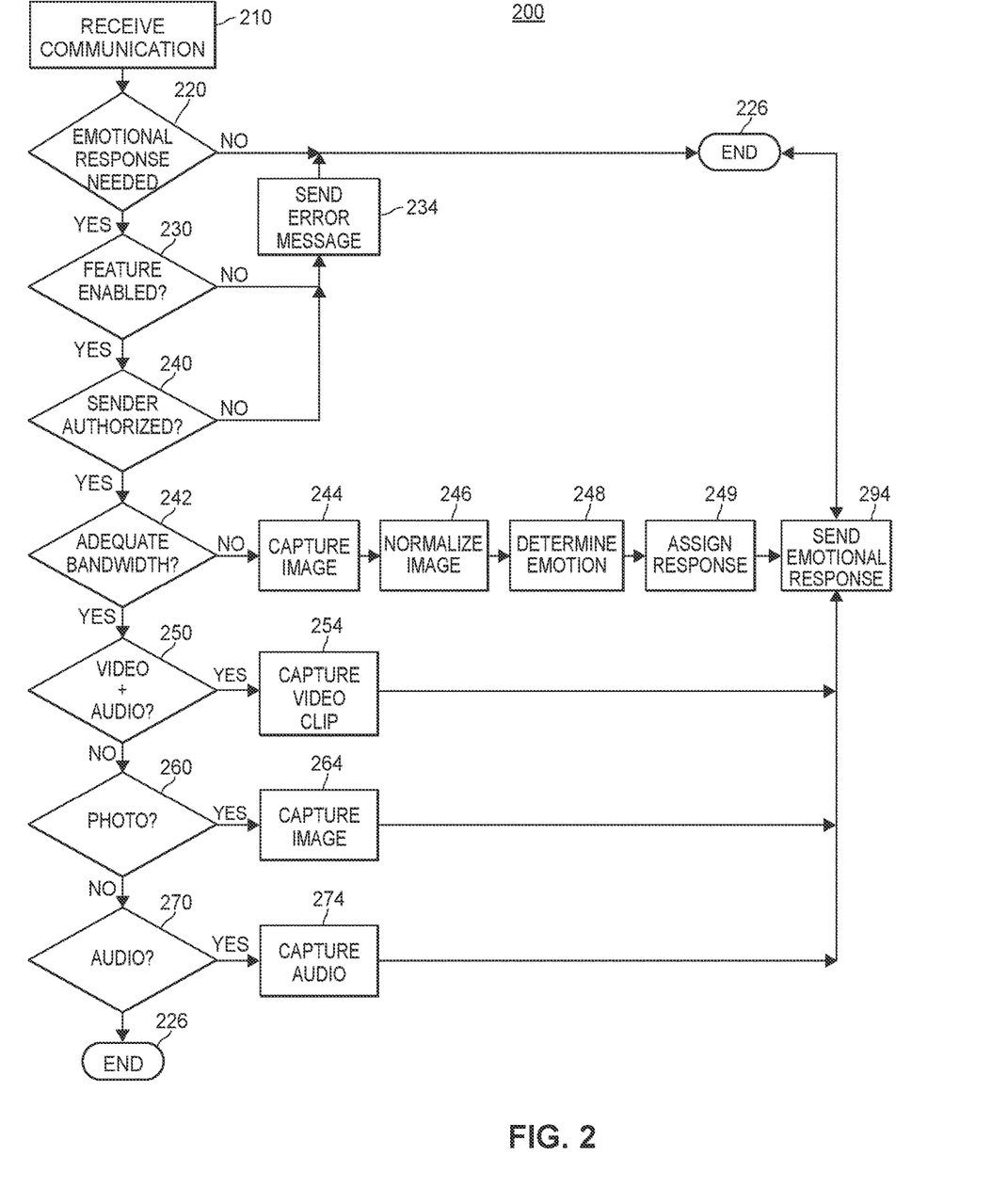
FIG. 2 illustrates a flow chart of an example method in accordance with some embodiments of the present disclosure.

FIG. 2 illustrates a flow chart of an example method 200, wherein the user equipment device receives an initial digital communication as shown in block 210 and eventually sends an automatic subsequent communication containing an emotional response to the initial digital communication such as shown in block 294. At block 210, an electronic communication is received at a user equipment device, such as a message received at UE1 101. After block 210 where the user equipment device receives the message, the user equipment device determines whether an immediate emotional response is needed as shown in decision block 220. In some embodiments, this may be an additional parameter in the message. In other embodiments, unused bits of the Short Message Peer to Peer (SMPP) protocol or unused bits in other telecommunication protocols may be used to indicate an emotional response is desired by sender of the message or by the recipient of the message. Alternately, the message could include a flag, such as the word "REAC" or another keyword, embedded in the payload of the message. If the user equipment device determines there is no response necessary, such as when no parameter or "REAC" flag is detected in the initial digital communication, then the method is ended 226. If a response is requested, the method continues to decision block 230 where the user equipment device determines that the feature is enabled for the user and device that received the original digital communication. This may be enabled by a setting in the user equipment device itself, or within a smartphone application, or enabled on the network such as at the HSS 140. If the feature is not enabled, an error message 234 may typically be sent to the sender of the message and the method is ended 226. If the feature is enabled, the method proceeds. In some embodiments, the requester of the emotional response must also be verified to be an approved recipient of the emotional response, as shown in 240. If the recipient is not approved, an error message 234 may optionally also be sent to the sender of the message and the method is ended 226. Again, this may be determined at the user equipment device 101, 102, 103, or on an application on the User Device, or on a network element such as the HSS 140.

If an emotional response is needed, the feature is enabled, and the recipient of the response is approved, the method 200 proceeds. In some embodiments, the user equipment device (or other computing device) determines if sufficient bandwidth is available to send the desired emotional response as shown in decision block 242. This may be done by comparing the expected size of a video clip of a user reaction to a predetermined user-selected size or user-selected number of seconds. The adequate bandwidth may also be determined automatically and dynamically from the data connection of the user equipment device 101, 102,103, or personal computer 112. If bandwidth is adequate, as discussed further below, a video clip may be captured at block 254 and automatically sent at block 294, a still image may be captured at block 264 and sent at block 294, or an audio clip may be captured at block 274 and sent at block 294. If bandwidth is limited by selection of the user or the network operator or is automatically determined to be insufficient to support subsequent video communication or image communication at decision block 242, the method 200 may proceed to generate and send a representative response (e.g., an emoji or emoticon). In some bandwidth insufficient embodiments, the representative response may include a message that the image of the user is not available or a message that the response has been adjusted due to bandwidth considerations.

To generate a representative response, a video clip or image may be captured and processed to generate the representative response using data captured by one or more input devices (e.g., cameras and/or microphones). If a camera is available on the device, the camera may be used to capture an image or a video clip as shown in block 244. This would typically be from a front facing camera of a cellphone or tablet device. The size or length of the video clip may be limited by a preselected value. The image, once captured, may then be normalized at block 246, such as by adjusting the position, orientation, centering, rescaling, resizing, reducing glare, adjusting the color, or changing the lighting of the image or video clip to obtain a normalized image. From the normalized images, the user equipment device may then use artificial intelligence techniques to determine one or more emotions of the user at block 248. These techniques may include Principal Component Analysis (PCA), Local Directional Pattern (LDP) recognition, Linear Discriminant Analysis (LDA), Bayesian Network Modeling or Markov Modeling in order to determine the emotion of the user from the normalized images. The set of emotions determined may typically include, for example, representations of happiness, sadness, fear, surprise, anger and disgust. One or more emotions of the user may be determined according to the Facial Actions Coding System (FACS) or another classification system in order to standardize the users observed emotions.

A representative response may then be assigned to the determined user emotions at block 249, such as emoticons, GIFs, or emojis. In some embodiments, the user may have previously selected and assigned such representative responses (e.g., a set of emoticons) to correspond to a static set of determined emotions. In other embodiments, machine learning techniques may be used to assign emotions to representative responses which may be dynamically updated by machine learning techniques over time. In either the dynamic or static embodiments, these representative responses are stored in a look-up table and selected by a processor based upon the determined user emotion. In one embodiment, default emoji's, GIFs or emoticons may be statically assigned by an application developer and stored in the RAM 304 memory of the user equipment device or in the ROM 306 memory to be selected as defaults if emoticons or emojis are not previously selected and assigned by the user. It is noted, however, that the meaning of emojis, GIFs and emoticons vary from region to region and even from individual to individual, therefore, if machine learning is not used, the ability for an individual user to assign emotions to an image may offer additional customization capabilities for the user.

Once the representative response has been assigned at block 249, the user device can immediately send the appropriate associated response. This is shown in block 294 where the response is immediately sent to the sender of the original communication, or to all members of a group message to which the sender belongs. The response may also be immediately sent to a social media server to share with members of a social media group, or to a video conference call server. These servers may be using the H.323 or Session Internet Protocol (SIP) protocols as shown in FIG. 1. In some embodiments, a representative response may be sent using a standardized image by reference to further reduce data transmission, such as by sending a Unicode reference to an emoji or by sending a resource locator reference to a GIF (e.g., a URL to an Internet-accessible resource). If a face is not detectable due to position, lighting, distance or another reason, an error message may instead be sent to the requester of the emotional response.

If it is determined there is adequate bandwidth at decision block 242, the method instead proceeds to capture and send an appropriate emotional response. If it is further determined that the user equipment device is capable of capturing video and audio and that an appropriate response may include video and audio at decision block 250, then a short video clip may immediately be captured in block 254. This video may be captured, for example, by the front-facing camera of a smartphone or by a camera of a tablet device. The length of the video capture can be settable by the user or by the network or determined by the user device dynamically after automatically determining the existence of sufficient bandwidth to support video transmission. The recipient of the response, usually the sender of the initial digital communication, is then determined, and the captured response is immediately sent at block 294. The response maybe routed, for example, through the MMSC 160 to another user equipment device 101, 102, 103. In some embodiments, a media server, including a social media server or a conference call server may be used to store or forward the video clip or a portion thereof.

If video is not available or not enabled but the user equipment device is determined to be capable of capturing an image at decision block 260, then an electronic image is captured at block 264. This image may be captured, for example, by the front-facing camera of a smartphone or a camera on a tablet device or a laptop device. As above, the recipient of the response may be determined (e.g., a "reply" or a "reply all"), and the captured response is sent at block 294. As above, the response may be routed through the MMSC 160 or SMSC 162 to another user equipment device 101, 102 including legacy 2G mobile phones, 108, or personal computer 112.

If the camera is not available or not enabled, but the user equipment device of the responder is determined to be capable of capturing an audio clip at decision block 270, then an audio clip is immediately captured as shown in block 274. The microphone of a smartphone or microphone of a laptop or a tablet device may capture this clip, for example. The recipient of the response is determined, and the captured response is sent to the recipient at block 294. The response may again be routed through the MMSC 160 to another user equipment device 101, 102, 103, or personal computer 112. In some embodiments, a media server or a conference call server may be used to forward the audio clip to the recipient.

Figure 3:
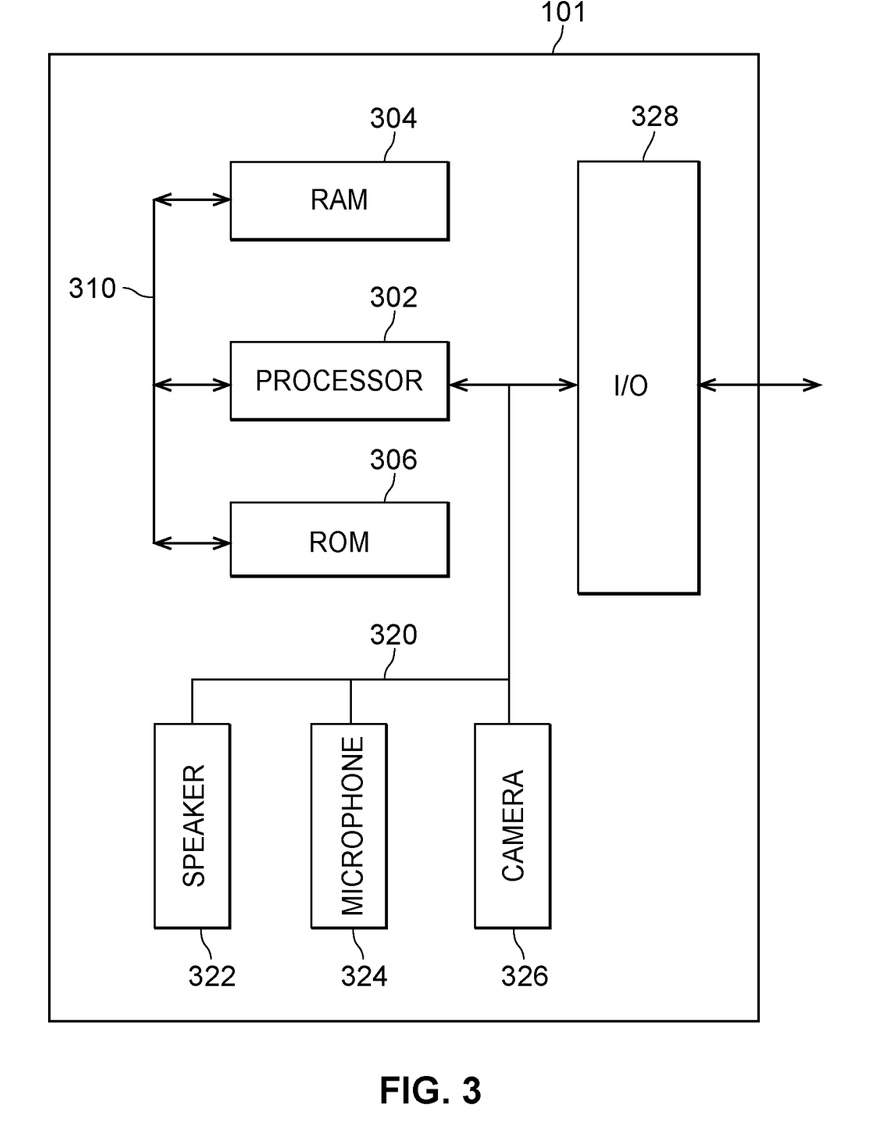
FIG. 3 illustrates a block diagram of an example user equipment device including a camera, microphone, memory, communication interface and processors that can execute the methods of this innovation.

FIG. 3 illustrates an exemplary user equipment device 101. The device may contain multiple types of memory as shown by the RAM 304 and the ROM 306 but may also include other types of non-transitory computer-readable storage medium. The RAM 304 or ROM 306 shown in FIG. 3 contain non-transitory computer-readable instruction storing executable instructions for implementing part or all of the techniques described herein, such as may be stored on a tablet application or smartphone application. The user equipment device 101 also contains one or more processors 302 connected to the RAM 304 and ROM 306 via a data-bus 310. The memory may include flash memory, magnetic media such as a hard-drive, thumb drive, or other non-transitory computer-readable storage medium storing executable instructions and additional data. The additional data may include a user configurable lookup table of emojis, emoticons or GIFs. The processor 302 is also connected to an input/output controller 328 which may transmit and receive radio waves. The processor is connected via bus 320 to one or more speakers 322, a microphone 324 and a camera 326 of the user equipment device 101.

Figure 4:
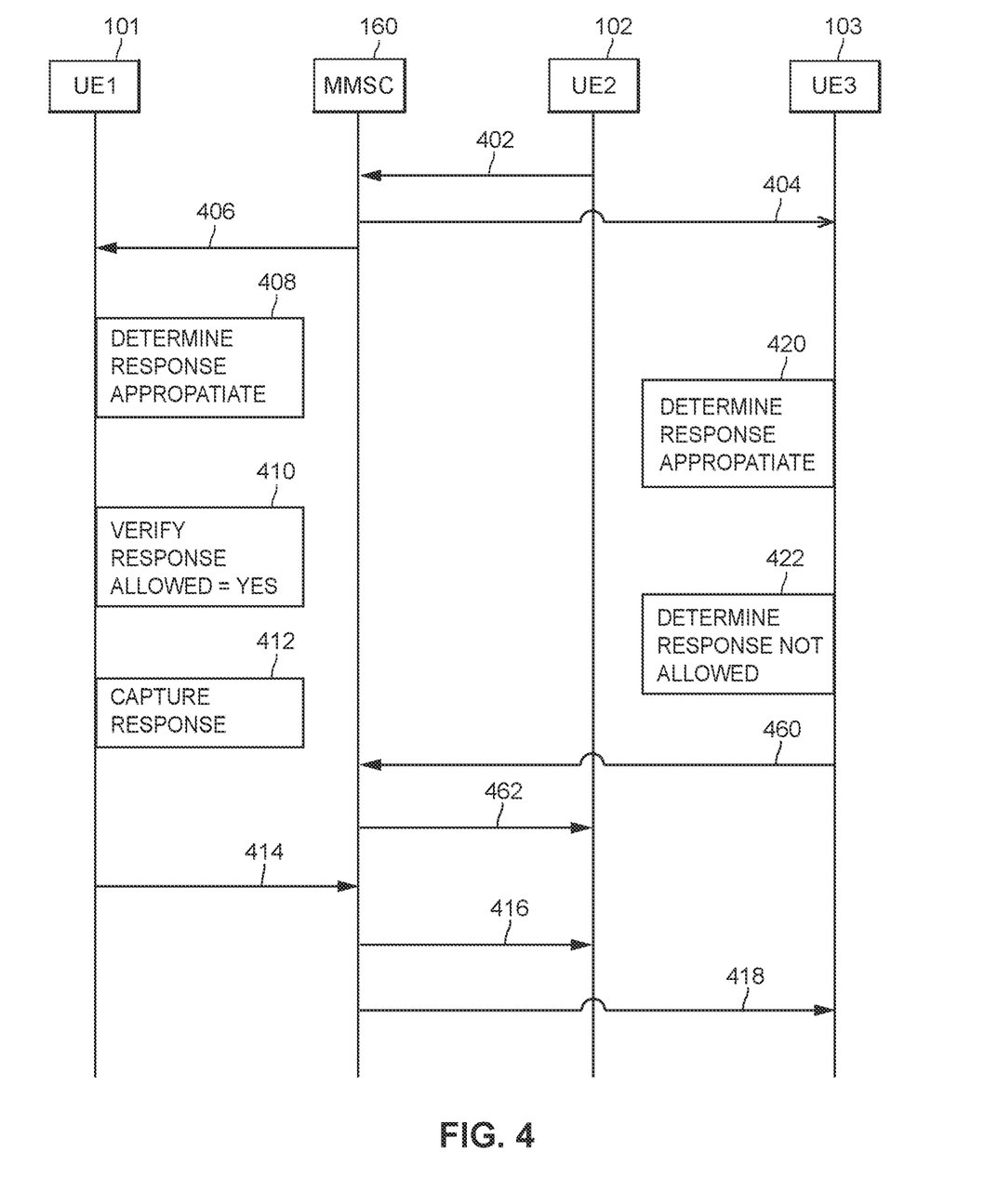
FIG. 4 illustrates an example message ladder diagram in which a Multi-Media group message from User Equipment 2 (UE1) is being set up via the Multi-Media Message Center (MMSC) to User Equipment 1 (UE1) and User Equipment 3 (UE3). UE1 has the feature enabled to immediately capture the response of the user of UE1 and transmit the response to the MMSC that is forwarded by the MMSC back to UE2 and to UE3.

FIG. 4 shows a message ladder diagram in which a group message is being sent from UE2 102 to UE3 103 and UE1 101 via the MMSC 160. The initial message 402 is sent from UE2 to the MMSC 160 and then distributed to UE1 101 and UE3 103. In some embodiments, the initial message 402 contains a parameter or a flag within the payload of the message indicating that UE2 102 requests a user's emotional response. The message 402 is received by the MMSC 160 and then relayed by the MMSC 160 in a message 404 to UE3 103. Since UE2 has addressed the message 402 to a group, the message is also relayed in a similar message 406 to UE1 101. In the example embodiment illustrated in FIG. 4, UE1 101 has enabled the emotional response feature (and, if relevant, UE2 102 and UE3 103 have been preapproved by UE1 101 as valid recipients of emotional responses from UE1).

When UE1 101 receives the message 406 for which an emotional response should be sent, UE1 101 determines whether capturing and sending an emotional response of the user is appropriate for the message 406. Such determination may be made based upon parameters of the message 406 (e.g., a request from the sender for a response), based upon settings of the UE1 101 (e.g., user settings regarding automatically generating and sending such responses), or based upon other considerations. In some embodiments, such determination may be made based upon the identity of the sender, prior communication with the sender, or content of the message 406 (e.g., analysis of text or detection of media in the message 406). For example, the message content may be parsed and analyzed to generate an emotional significance score (e.g., based upon key phrases, such as "congratulations" or "happy birthday"), which may be used to determine whether a response should be captured. In block 410, UE1 101 determines that capturing and sending an emotional response of the user is allowed. This may include determining that the Emotional Response feature is enabled and that UE2 102 and UE3 103 are permitted recipients of the emotional response from UE1 101. In block 412, the emotion of the user of UE1 101 is captured via still image, video or audio to be used in generating an emotional response (e.g., a video, image, audio recording, GIF, emoji, or emoticon) that is transmitted in message 414 back to the MMSC 160. In some embodiments, the user may be prompted to approve or confirm sending the emotional response, prior to the UE1 101 sending message 414. The message 414 may indicate one or more recipients of the emotional response, thereby allowing the user to limit the recipients of such response. The MMSC 160 then forwards the emotional response captured by UE1 101 to UE2 102 and UE3 103 via messages 416 and 418, respectively.

At almost the same time that the MMSC 160 sends the message 406 to UE1 101, the MMSC 160 sends message 404 to UE3 103. When UE3 103 receives the message 404, the UE3 103 determines whether capturing and sending an emotional response of the user is appropriate at block 420. Such determination may be made in a manner similar to that of UE1 101 at block 408. In the illustrated example, the user of UE3 103 has not approved UE2 102 as a valid recipient of an emotional response message. The UE3 103 determines that the request is to send an emotional response to one or more unapproved recipients at block 422. The UE3 103 then sends an error response 460 to the MMSC 160, and the MMSC 160 then forwards the error message 462 to UE2 102 as the sender of the initial message (and, in some instances, as a requester of the emotional response). Not shown in FIG. 4 are Wireless Application Protocol (WAP) servers and routers needed in the transmission process.

Figure 5:
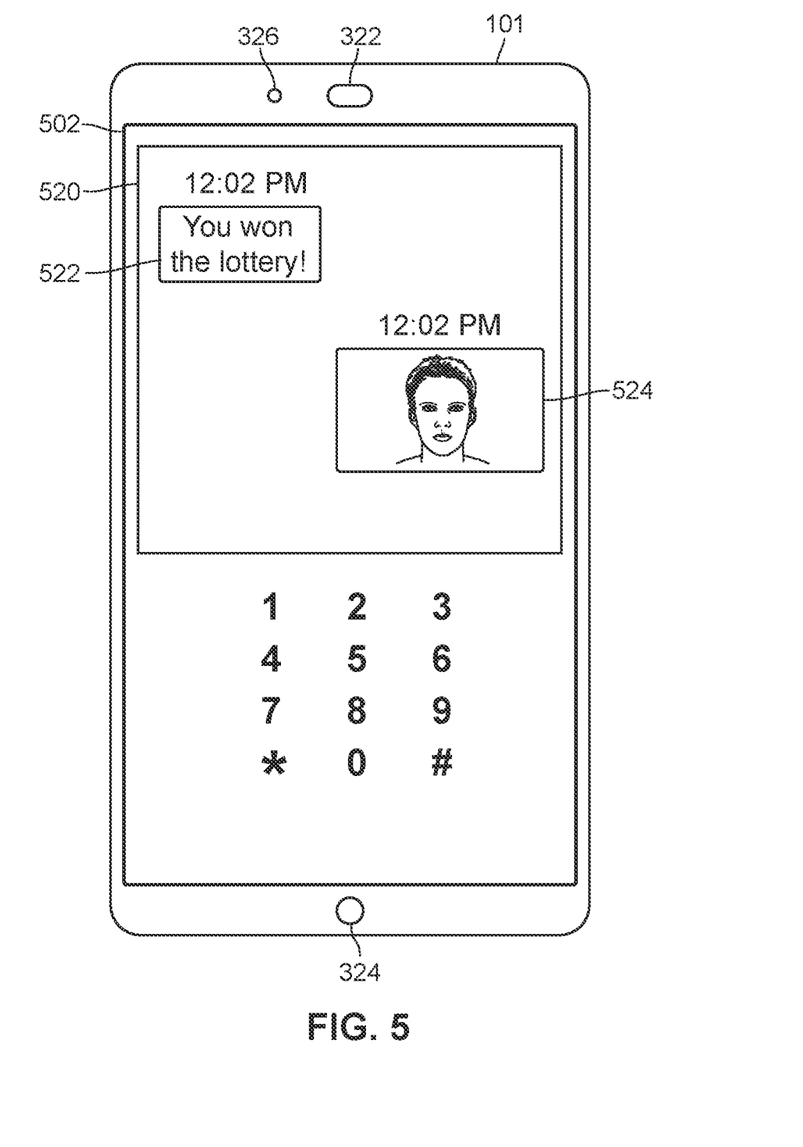
FIG. 5 illustrates an example of a display of a user equipment device, a smartphone that has received an incoming communication and the device immediately responds to the message by capturing and transmitting a photo of the user.

FIG. 5 illustrates a sample screen 502 of a user equipment device UE1 101 that receives a message and immediately responds with an image, video, emoji, emoticon or GIF showing an emotional response. In FIG. 5, UE1 101 includes the microphone 324, the camera 326 and the speaker 322 previously shown in FIG. 3. FIG. 5 also includes a screen 502 and a messaging application program 520. The application program comprises executable instructions stored in non-transitory computer-readable storage medium such as the RAM 304 or ROM 306 previously shown in FIG. 3. The output of the instructions are then displayed by a graphical user interface of the messaging application program 520 within the screen 502. Shown within the messaging application program 520 is a message 522 with timestamp 12:02 pm that is received from a lottery notification service or another VASP 164 notifying the user of UE1 101 that they have won the lottery. Since the user of UE1 101 has previously allowed an emotional response to the VASP 164, the emotional response is previously approved. The device immediately responds to the message by capturing the response, and transmitting an image of the user 524 with the same or very similar timestamp to the lottery notification VASP by way of the MMSC 160 or another messaging server. Of course, if the user of the UE1 101 did not view the message 522 until a later time, the timestamp on the image of the user 524 would instead reflect the later time the user viewed the message 522. In another embodiment, UE1 101 may transmit a video clip if bandwidth was sufficient.

Figure 6:
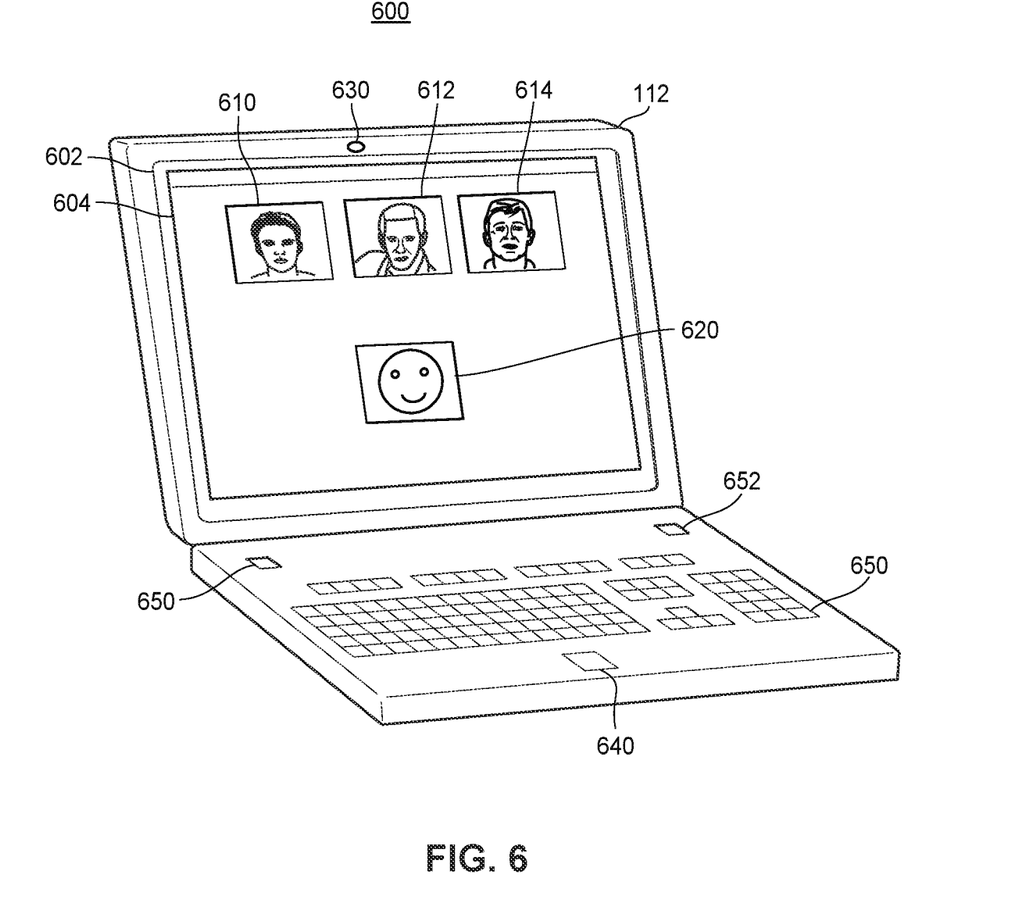
FIG. 6 illustrates an example of a display of another user equipment device, a laptop computer, in which the user is participating in a conference call but the user of the laptop is bandwidth restricted and cannot perform streaming video. In this embodiment, the laptop uses its camera to capture the emotion of the user. The laptop then processes the captured image or video, determines the emotion and uploads an emoticon associated with that emotion to the conference server reflecting the user's emotional state.

FIG. 6 illustrates another user equipment device, a personal computer 112 where the user is participating in a conference call. Due to lack of resources on the user equipment device, such as limited Wi-Fi bandwidth or due to network limitations, the personal computer 112 automatically determined that it could not perform streaming video. However, an emoticon communication in the conference is possible. The personal computer 112 is illustrated as a laptop computer in FIG. 6 and includes a camera 630, a microphone 640, speakers 650 and 652, a keyboard 660, and a screen 602. Displayed on the screen is a conferencing application 604, as well as livestream video of other participants 610, 612, 614 in the video conference. The camera 630 monitors the user of the personal computer 112, and the processor 302 periodically uses input from the camera's still or video image or from the microphone, and uses any of several techniques to normalize the image or images, classify the images to determine the appropriate emotion and determine the appropriate emoji, GIF or emoticon to display. The processor 302 then transmits the appropriate response back to the conference call server for distribution to the other participants on the call. The emoticon as a response, shown as 620 instead of a livestream, thereby allows the bandwidth-limited user to share their emotions with a minimum of upload bandwidth.

For ease of explanation, the disclosure may generally refer to specific components as performing the various calculations and other functions implemented by the embodiments described herein. However, it will be understood that any suitable function described herein is not limited to the particular component for which its functionality is described.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

Throughout this specification, plural instances may implement components, operations, or structures described as a single instance. Although individual operations of one or more methods are illustrated and described as separate operations, one or more of the individual operations may be performed concurrently in some instances. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software contained in a non-transitory computer-readable storage medium storing executable instructions (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple such modules exist contemporaneously, communications may be achieved through signal transmissions (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to cause the processors to perform the relevant operations. Whether temporarily or permanently configured, such processors may constitute processor-implemented modules that operate to cause the processors to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some example embodiments, the one or more processors or processor-implemented modules may be located in a single geographic location (e.g., at a location of a mobile computing device or at a server farm). In other example embodiments, the one or more processors or processor-implemented modules may be distributed across a number of geographic locations.

What is claimed:

1. A method for automatically providing an emotional response of a user after an initial digital communication is received by a user equipment device of the user, comprising:
   receiving, at the user equipment device, a digital communication for the user from an initial message sender;
   determining, by a processor of the user equipment device, an automatic emotional response of the user to the digital communication is desired;
   capturing, by a camera of the user equipment device, one or more images of the user at a time of receiving the digital communication;
   determining, by the processor of the user equipment device, a bandwidth limitation for a response message from the user equipment device to the initial message sender, such that a video or digital image cannot be included as an indication of the emotional response of the user in the response message;
   in response to determining the bandwidth limitation, determining, by the processor of the user equipment, the emotional response of the user from a set of standardized emotional responses based upon the one or more images;
   determining, by the processor of the user equipment, a representative response as a graphical representation substituting for the one or more images as the indication of the emotional response of the user;
   generating, by the processor of the user equipment device, the response message including the representative response as the indication of the emotional response of the user based upon the one or more images; and
   sending, from the user equipment device to a device associated with the initial message sender, a subsequent communication comprising the response message.

2. The method of claim 1, wherein the representative response comprises an emoji, GIF or emoticon.

3. The method of claim 1, wherein determining the emotional response based upon the one or more images comprises:
   normalizing the one or more images to obtain one or more normalized images; and
   determining the emotional response of the user based upon the one or more normalized images.

4. The method of claim 1, wherein generating the response message comprises selecting the representative response from a lookup table that associates a plurality of emotional responses with a corresponding plurality of representative responses each comprising an emoji, GIF or emoticon.

5. The method of claim 4, further comprising, prior to receiving the digital communication:
   receiving, at the user equipment device, user selections of at least some of the plurality of representative responses from the user to indicate each respective user-selected representative response with a corresponding one of the plurality of emotional responses; and
   assigning, by the processor of the user equipment device, each user-selected representative response with the corresponding one of the plurality of emotional responses in the lookup table.

6. The method of claim 1, wherein determining the automatic emotional response is desired comprises determining the digital communication includes a parameter or a keyword indicating a request from the initial message sender for the emotional response of the user to the digital communication.

7. The method of claim 1, further comprising:
   determining, by the processor of the user equipment device, that automatically capturing and sending a response to the initial message sender as an authorized recipient of emotional responses of the user has been previously authorized by the user.

8. The method of claim 1, wherein the digital communication is received from a value-added service provider.

9. The method of claim 1, wherein:
   the one or more images of the user at the time of receiving the digital communication comprise a video clip; and
   the video clip is limited to a user-selected size or user-selected number of seconds.

10. A non-transitory computer-readable storage medium storing executable instructions that, when executed by a processor of a user equipment device, cause the processor to:
    receive a digital communication from an initial message sender;
    determine an automatic emotional response to the digital communication is desired;
    capture by a camera of a user equipment device one or more images of a user at a time of receiving the digital communication;
    determine a bandwidth limitation for a response message from the user equipment device to the initial message sender, such that a video or digital image cannot be included as an indication of the emotional response of the user in the response message;
    in response to determining the bandwidth limitation, determine the emotional response of the user from a set of standardized emotional responses based upon the one or more images;
    determine a representative response as a graphical representation substituting for the one or more images as the indication of the emotional response of the user;
    generate the response message including the representative response as the indication of the emotional response of the user based upon the one or more images; and
    send from the user equipment device to a device associated with the initial message sender a subsequent communication comprising the response message.

11. The non-transitory computer-readable storage medium of claim 10, further storing executable instructions that, when executed by the processor, cause the processor to:
    normalize the image or video clip; and
    determine the emotional response of the user based upon the one or more normalized images.

12. The non-transitory computer-readable storage medium of claim 11, wherein the representative response comprises an emoji, GIF or emoticon.

13. A system for automatically providing an automatic emotional response to an initial digital communication, comprising:
    one or more processors;
    a camera;
    a communication interface; and
    a memory operatively connected to the one or more processors and storing executable instructions that, when executed by the one or more processors, cause the system to:

receive a digital communication for a user from an initial message sender via the communication interface;

determine an automatic emotional response of the user to the digital communication is desired;

capture one or more images of a user's emotional response to the initial digital communication using the camera;

determine a bandwidth limitation for a response message from the user equipment device to the initial message sender, such that a video or digital image cannot be included as an indication of the emotional response of the user in the response message;

in response to determining the bandwidth limitation, determine the emotional response of the user from a set of standardized emotional responses based upon the one or more images;

determine a representative response as a graphical representation substituting for the one or more images as the indication of the emotional response of the user;

generate the response message including the representative response as the indication of the emotional response of the user based upon the one or more images; and send a subsequent communication comprising the response message to a device associated with the initial message sender via the communication interface.

14. The system of claim 13, wherein the executable instructions further cause the system to normalize the image or video clip prior to generating the response message.

15. The system of claim 13, wherein the executable instructions that cause the system to determine the automatic emotional response to the communication is desired further cause the system to use a parameter or keyword contained in the initial digital communication is used to determine the automatic emotional response to the communication is desired.

16. The system of claim 13, wherein the memory of the system further stores a lookup table that associates a plurality of emotional responses with a corresponding plurality of representative responses, each representative response comprising an emoji, GIF or emoticon.

17. The system of claim 13, wherein the system comprises a smartphone or a tablet computing device.

* * * * *